United States Patent
Bai

(10) Patent No.: US 9,634,984 B2
(45) Date of Patent: Apr. 25, 2017

(54) METHOD FOR CONFIGURING DNS SERVER AND DRIVING APPARATUS OF WIRELESS DATA ACCESS DEVICE

(71) Applicant: ZTE CORPORATION, Shenzhen, Guangdong Province (CN)

(72) Inventor: Jie Bai, Shenzhen (CN)

(73) Assignee: ZTE CORPORATION (CN)

(*) Notice: Subject to any disclaimer, the term of this patent is extended or adjusted under 35 U.S.C. 154(b) by 187 days.

(21) Appl. No.: 14/396,991

(22) PCT Filed: Jul. 12, 2013

(86) PCT No.: PCT/CN2013/079282
§ 371 (c)(1),
(2) Date: Oct. 24, 2014

(87) PCT Pub. No.: WO2013/178141
PCT Pub. Date: Dec. 5, 2013

(65) Prior Publication Data
US 2015/0067166 A1 Mar. 5, 2015

(30) Foreign Application Priority Data
Aug. 16, 2012 (CN) .......................... 2012 1 0292228

(51) Int. Cl.
*G06F 15/173* (2006.01)
*H04L 29/12* (2006.01)
(Continued)

(52) U.S. Cl.
CPC ...... *H04L 61/2015* (2013.01); *H04L 61/1511* (2013.01); *H04L 69/167* (2013.01); *H04W 76/021* (2013.01); *H04L 61/6086* (2013.01)

(58) Field of Classification Search
USPC ................................ 709/220, 225, 227, 245
See application file for complete search history.

(56) References Cited

U.S. PATENT DOCUMENTS

| | | | |
|---|---|---|---|
| 7,143,435 B1 * | 11/2006 | Droms | ............... H04L 29/1232 713/153 |
| 2006/0174031 A1 | 8/2006 | Yamakoshi et al. | |
| 2012/0271912 A1 * | 10/2012 | Cho | ................... H04L 61/2015 709/217 |

FOREIGN PATENT DOCUMENTS

| CN | 1630233 A | 6/2005 |
|---|---|---|
| CN | 102006286 A | 4/2011 |
| CN | 102833362 A | 12/2012 |

OTHER PUBLICATIONS

Scott Lowe: "Setting DNS and WINS Server Addresses Remotely. Scotts Weblog. The weblog of an IT pro specializing in virtualization, networking, open source, and cloud computing", Jul. 7, 2006, pp. 1-4, XP055260879.
(Continued)

Primary Examiner — Lan-Dai T Truong
(74) Attorney, Agent, or Firm — Plumsea Law Group, LLC

(57) ABSTRACT

A method for configuring a Domain Name System (DNS) server and a driving apparatus of a wireless data access device are provided. The method includes: after a wireless data access device is successfully networked with a terminal, a driving apparatus of the wireless data access device judging whether a user has set a DNS server address in the terminal; and if yes, the driving apparatus not automatically configuring a DNS server address; otherwise, the driving apparatus setting a DNS server address obtained from the wireless data access device in the terminal. With the present invention, the problem in related technologies that the terminal cannot be guaranteed to use a DNS server manually configured by a user always in preference to a DNS server automatically configured by a driver is solved, normal use of IPv4 and IPv6 DNS servers is ensured, and the stability and accuracy of a system are improved.

12 Claims, 5 Drawing Sheets

(51) Int. Cl.
*H04L 29/06* (2006.01)
*H04W 76/02* (2009.01)

(56) References Cited

OTHER PUBLICATIONS

"Powershell: Get IP Address, Subnet, Gateway, DNS servers and MAC details of remote computer", Techibee.com, Feb. 17, 2012, pp. 1-35, XP055260873.
European Search Report issued Apr. 5, 2016 in European Patent Application No. EP 13797964.7.

* cited by examiner

METHOD FOR CONFIGURING DNS SERVER AND DRIVING APPARATUS OF WIRELESS DATA ACCESS DEVICE

CROSS-REFERENCE TO RELATED APPLICATION(S)

This application is the US National Phase application of PCT application number PCT/CN2013/079282 having a PCT filing date of Jul. 12, 2013, which claims priority of Chinese patent application 201210292228.3 filed on Aug. 16, 2012, the disclosures of which are hereby incorporated by reference.

TECHNICAL FIELD

The present document relates to the field of communications, and in particular, to a method for configuring a Domain Name System (DNS) server and a driving apparatus of a wireless data access device.

BACKGROUND OF THE RELATED ART

With the development of personal wireless communication technology as well as the launch and use of the third and fourth generation wireless communication standards, personal broadband wireless data communication services have been rapidly developed, and users can access to a wireless network through the wireless data access device. When the terminal is connected to the wireless network through a wireless data access device, a Domain Name System (DNS for short) plays a very important role. Especially the IPv4 address resources of the global Internet are dwindling, the IPv6 technology greatly reduces the pressure existing in the IPv4 address, but a 128-bit IPv6 address is not so easy to remember as the IPv4 address. Therefore, the DNS is becoming more important in the IPv6. The main function of the DNS is to locate the network resources accurately through a mutual mapping relationship between domain names and IP addresses, realizing a function of querying an IP address according to a domain name.

The domain name server is normally configured using an automatic configuration mode. For some particular cases, a carrier needs a user to manually configure a DNS server address. Therefore, in the related technologies, the following three manners to configure the DNS server may possibly coexist: (1) the user specifying a DNS server address through network connection attributes provided by a terminal (i.e., manual configuration by a user); (2) the user configuring a DNS server address through an application program (i.e., manual configuration by a user); and (3) automatically configuring a DNS server address, which has two mechanisms at present, i.e., automatic configuration by the terminal and automatic configuration by a driving apparatus. For example, when a Dynamic Host Configuration Protocol (DHCP for short) on the terminal is disabled, the automatic configuration is automatic configuration by the driving apparatus. At this time, when the automatic configuration method by the driving apparatus and the manual configuration method by the user exist at the same time, the driving apparatus not only needs to ensure the provision of the DNS server address in the terminal, but also needs to ensure that the terminal uses the DNS server address set by the user in preference after the user configures the DNS server address. Since a final interface automatically configured by the driving apparatus in the terminal and a final interface manually configured by the user locate at the same place, there is a case that an address which is configured later will rewrite the interface, which will result in an address which is set previously being invalid.

Thus, in the related technologies, if the driving apparatus does not know whether the user performs a manual setting, it cannot ensure that the configuration by a user precedes the automatic configuration by a driver, and thus the requirements of the carrier cannot be achieved.

SUMMARY OF THE INVENTION

The present document provides a method for configuring a DNS server and a driving apparatus of a wireless data access device, to at least solve the above problem in the related technologies that the terminal cannot be guaranteed to use a DNS server manually configured by a user always in preference to a DNS server automatically configured by a driver.

According to an aspect of the present document, a method for configuring a DNS server is provided, comprising:

after a wireless data access device is successfully networked with a terminal, a driving apparatus of the wireless data access device judging whether a user has set a DNS server address in the terminal; and if yes, the driving apparatus not automatically configuring a DNS server address; and if the user has not set a DNS server address in the terminal, the driving apparatus setting a DNS server address acquired from the wireless data access device in the terminal.

The step of the driving apparatus judging whether a user has set a DNS server address in the terminal comprises:

the driving apparatus acquiring the DNS server address of the terminal from a registry interface of the terminal, and judging whether a value of the DNS server address is empty; and if the value of the DNS server address is empty, confirming that the user has not set the DNS server address in the terminal; and if the value of the DNS server address is not empty, confirming that the user has set the DNS server address in the terminal.

The step of the driving apparatus acquiring the DNS server address of the terminal from a registry interface of the terminal comprises:

the driving apparatus judging whether an IPv4 address or an IPv6 address is successfully connected currently according to information after the networking is successful and a preset data format; and if the IPv4 address is successfully connected currently, the driving apparatus acquiring an IPv4 DNS server address of the terminal from an IPv4 interface in the registry of the terminal; and if the IPv6 address is successfully connected currently, the driving apparatus acquiring an IPv6 DNS server address of the terminal from an IPv6 interface in the registry of the terminal.

The method further comprises:

after setting the DNS server address acquired from the wireless data access device in the terminal, the driving apparatus updating an setter identity of the DNS server address in the registry of the terminal to the driving apparatus, wherein, the setter identity of the DNS server address indicates a setting mode of the DNS server address in the registry interface of the terminal is at least one of: the driving apparatus setting though network connection attributes, a user setting through network connection attributes, and the user setting through an application program.

The method further comprises:

before the wireless data access device is disconnected from the terminal in the network, the driving apparatus acquiring the setter identity of the DNS server address in the registry of the terminal, and in a case that the setter identity of the DNS server address is determined as the driving apparatus, clearing the value of the DNS server address in the registry of the terminal, and updating the setter identity of the DNS server address.

According to another aspect of the present document a driving apparatus of a wireless data access device is provided, comprising:

a judgment module, configured to judge whether a user has set a DNS server address in the terminal after the wireless data access device is successfully networked with a terminal; and a processing module, configured to not automatically configure a DNS server address in a case that the judgment module determines that the user has set a DNS server address in the terminal; and set a DNS server address acquired from the wireless data access device in the terminal in a case that the judgment module determines that the user has not set a DNS server address in the terminal.

The judgment module comprises:

an acquisition unit, configured to acquire the DNS server address of the terminal from a registry interface of the terminal; and a judgment unit, configured to judge whether a value of the DNS server address acquired by the acquisition unit is empty, and when the value of the DNS server address is empty, confirm that the user has not set the DNS server address in the terminal; and when the value of the DNS server address is not empty, confirm that the user has set the DNS server address in the terminal.

The judgment unit is further configured to judge whether an IPv4 address or an IPv6 address is successfully connected currently according to information after the networking is successful and a preset data format: and the acquisition unit is further configured to acquire an IPv4 DNS server address of the terminal from an IPv4 interface in the registry of the terminal in a case that the judgment unit determines that the IPv4 address is successfully connected currently; and acquire an IPv6 DNS server address of the terminal from an IPv6 interface in the registry of the terminal in a case that the judgment unit determines that the IPv6 address is successfully connected currently.

The driving apparatus further comprises:

an updating module, configured to update an setter identity of the DNS server address in the registry of the terminal to the driving apparatus after the processing module sets the DNS server address acquired from the wireless data access device in the terminal, wherein, the setter identity of the DNS server address indicates a setting mode of the DNS server address in the registry interface of the terminal is at least one of: the driving apparatus setting though network connection attributes, a user setting through network connection attributes, and the user setting through an application program.

The driving apparatus further comprises:

a clearing module, configured to acquire the setter identity of the DNS server address in the registry of the terminal before the wireless data access device is disconnected from the terminal in the network, and clear the value of the DNS server address in the registry of the terminal and indicate the updating module to update the setter identity of the DNS server address in a case that the setter identity of the DNS server address is determined as the driving apparatus.

With the present document, after the wireless data access device is successfully networked with a terminal, the driving apparatus of the wireless data access device judges whether a user has set a DNS server address in the terminal; and in a case that it is determined that the user has set a DNS server address in the terminal, the driving apparatus does not automatically configure a DNS server address; and in a case that it is determined that the user has not set a DNS server address in the terminal, the driving apparatus sets a DNS server address acquired from the wireless data access device in the terminal In such way, the problem in related technologies that the terminal cannot be guaranteed to use a DNS server manually configured by a user always in preference to a DNS server automatically configured by a driver is solved, normal use of IPv4 and IPv6 DNS servers is ensured, and the stability and accuracy of a system are improved.

BRIEF DESCRIPTION OF DRAWINGS

The accompanying drawings described herein are used to provide a better understanding of the present document and constitute a part of this application, and the schematic embodiments of the present invention and the descriptions thereof are used to explain the present document and do not constitute an improper definition of the document. In the accompanying drawings.

PREFERRED EMBODIMENTS OF THE PRESENT INVENTION

The present document will be described in detail with respect to accompanying drawings and in conjunction with embodiments hereinafter. It should be illustrated that without conflict, the embodiments in the application and the features of the embodiments can be combined with each other.

Figure 1:
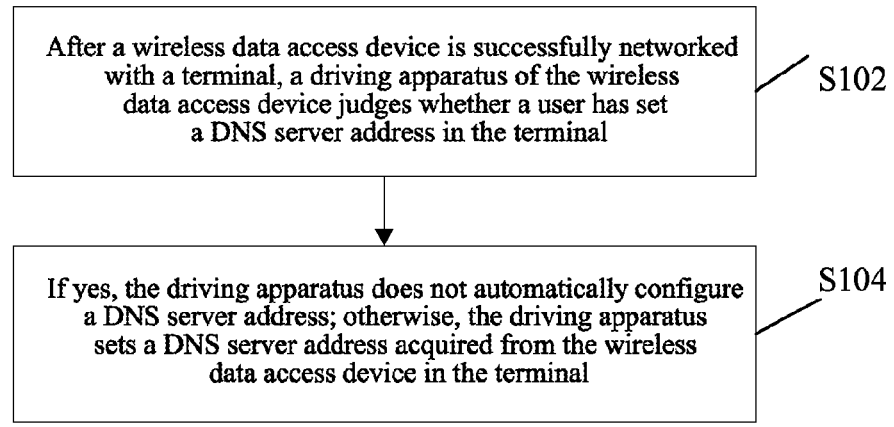
FIG. 1 is a flowchart of a method for configuring a DNS server according to an embodiment of the present invention.

According to embodiments of the present invention, a method for configuring a Domain Name System (DNS) server is provided. FIG. 1 is a flowchart of a method for configuring a DNS server according to the embodiments of the present invention. As shown in FIG. 1, the method includes the following steps.

In step S102, after a wireless data access device is successfully networked with a terminal, a driving apparatus of the wireless data access device judges whether a user has set a DNS server address in the terminal; and In step S104, if yes, the driving apparatus does not automatically configure a DNS server address; otherwise, the driving apparatus sets a DNS server address acquired from the wireless data access device in the terminal.

With the above steps, after the wireless data access device is successfully networked with a terminal, the driving apparatus of the wireless data access device judges whether a user has set a DNS server address in the terminal; and in a case that it is determined that the user has set a DNS server address in the terminal, the driving apparatus does not automatically configure a DNS server address; and in a case that it is determined that the user has not set a DNS server address in the terminal, the driving apparatus sets a DNS server address acquired from the wireless data access device in the terminal. In such way, the problem in related technologies that the terminal cannot be guaranteed to use a DNS server manually configured by a user always in preference to a DNS server automatically configured by a driver is solved, normal use of IPv4 and IPv6 DNS servers is ensured, and the stability and accuracy of a system are improved.

In step S102, the driving apparatus judging whether a user has set a DNS server address in the terminal may comprise: the driving apparatus acquiring the DNS server address of the terminal from a registry interface of the terminal, and judging whether a value of the DNS server address is empty; and if the value of the DNS server address is empty, confirming that the user has not set the DNS server address in the terminal; and if the value of the DNS server address is not empty, confirming that the user has set the DNS server address in the terminal. This method is simple and practical, and has a strong operability.

In an implementation, the driving apparatus acquiring the DNS server address of the terminal from a registry interface of the terminal may comprise: the driving apparatus judging whether an IPv4 address or an IPv6 address is successfully connected currently according to information after the networking is successful and a preset data format; and if the IPv4 address is successfully connected currently, the driving apparatus acquiring an IPv4 DNS server address of the terminal from an IPv4 interface in the registry of the terminal; and if the IPv6 address is successfully connected currently, the driving apparatus acquiring an IPv6 DNS server address of the terminal from an IPv6 interface in the registry of the terminal. The method can acquire a corresponding DNS server address according to an IP address to which is successfully networked so as to implement judgment, which improves the flexibility of the system.

In the step S104, after setting the DNS server address acquired from the wireless data access device in the terminal, the driving apparatus may update an setter identity of the DNS server address in the registry of the terminal to the driving apparatus, wherein, the setter identity of the DNS server address indicates a setting mode of the DNS server address in the registry interface of the terminal is at least one of: the driving apparatus, a user setting through network connection attributes, and the user setting through an application program. This method adds an setter identity of a DNS server address for distinguishing whether a DNS server address is manually configured (by a user) or is automatically configured (by a driving apparatus), which improves the operability of the system.

Wherein, before the wireless data access device is disconnected from the terminal in the network, the driving apparatus acquires the setter identity of the DNS server address in the registry of the terminal, and in a case that the setter identity of the DNS server address is determined as the driving apparatus, clears the value of the DNS server address in the registry of the terminal, and updates the setter identity of the DNS server address. This method ensures that a DNS server which is manually configured is preferably selected, which improves the precision and accuracy of the system.

Figure 2:
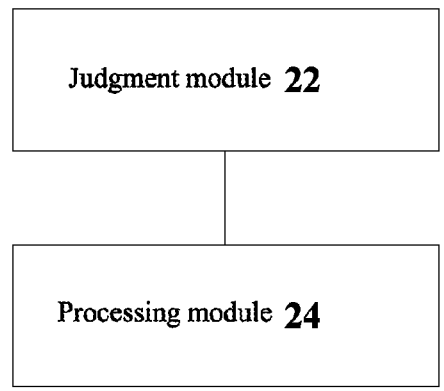
FIG. 2 is a structural block diagram of a driving apparatus of a wireless data access device according to an embodiment of the present invention.

The embodiments of the present invention further provide a driving apparatus of a wireless data access device corresponding to the above method. FIG. 2 is a structural block diagram of a driving apparatus of a wireless data access device according to the embodiments of the present invention. As shown in FIG. 2, the apparatus comprises; a judgment module 22, configured to judge whether a user has set a DNS server address in the terminal after the wireless data access device is successfully networked with a terminal; and a processing module 24 coupled to the judgment module 22 and configured to not automatically configure a DNS server address in a case that the judgment module 22 determines that the user has set a DNS server address in the terminal; and set a DNS server address acquired from the wireless data access device in the terminal in a case that the judgment module 22 determines that the user has not set a DNS server address in the terminal.

With the above apparatus, the judgment module 22 judges whether a user has set a DNS server address in the terminal after the wireless data access device is successfully networked with a terminal; and the a processing module 24 does not automatically configure a DNS server address in a case that it is determined that the user has set a DNS server address in the terminal; and set a DNS server address acquired from the wireless data access device in the terminal in a case that it is determined that the user has not set a DNS server address in the terminal. The problem in related technologies that the terminal cannot be guaranteed to use a DNS server manually configured by a user always in preference to a DNS server automatically configured by a driver is solved, normal use of IPv4 and IPv6 DNS servers is ensured, and the stability and accuracy of a system are improved.

Figure 3:
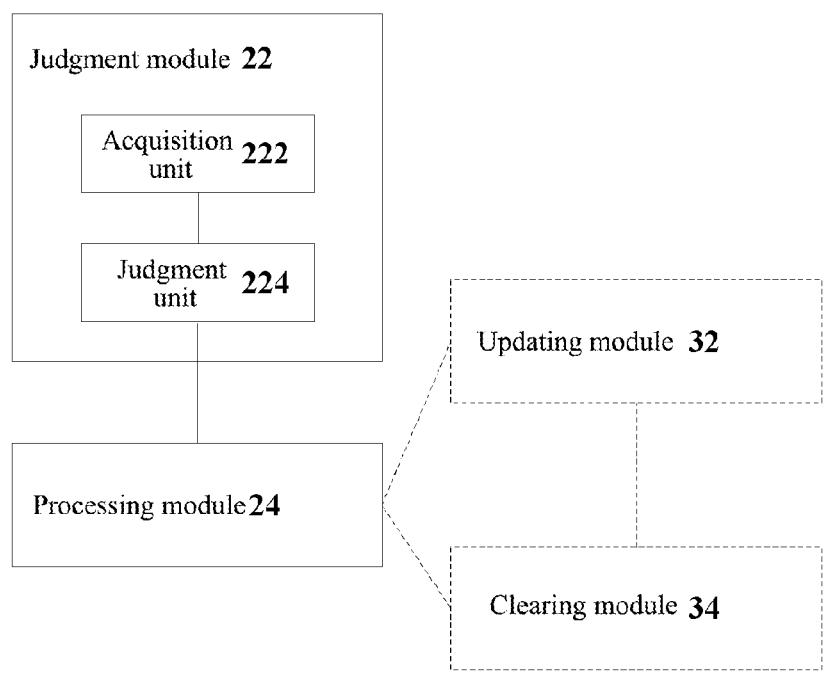
FIG. 3 is a structural block diagram of a driving apparatus of a wireless data access device according to a preferable embodiment of the present invention.

FIG. 3 is a structural block diagram of a driving apparatus of a wireless data access device according to a preferable embodiment of the present invention. As shown in FIG. 3, the judgment module 22 may include an acquisition unit 222, configured to acquire the DNS server address of the terminal from a registry interface of the terminal; and a judgment unit 224 coupled to the acquisition unit 222 and configured to judge whether a value of the DNS server address acquired by the acquisition unit 222 is empty, and when the value of the DNS server address is empty, confirm that the user has not set the DNS server address in the terminal; and when the value of the DNS server address is not empty, confirm that the user has set the DNS server address in the terminal.

Preferably, the judgment unit 224 is further configured to judge whether an IPv4 address or an IPv6 address is successfully connected currently according to information after the networking is successful and a preset data format; and the acquisition unit 222 is further configured to acquire an IPv4 DNS server address of the terminal from an IPv4 interface in the registry of the terminal in a case that the judgment unit 224 determines that the IPv4 address is successfully connected currently; and acquire an IPv6 DNS server address of the terminal from an IPv6 interface in the registry of the terminal in a case that the judgment unit 224 determines that the IPv6 address is successfully connected currently.

Preferably, the driving apparatus of the wireless data access device may also comprise an updating module 32 coupled to the processing module 24 and configured to update an setter identity of the DNS server address in the registry of the terminal to the driving apparatus after the processing module sets the DNS server address acquired from the wireless data access device in the terminal, wherein, the setter identity of the DNS server address indicates a setting mode of the DNS server address in the registry interface of the terminal is at least one of: the driving apparatus, a user setting through network connection attributes, and the user setting through an application program.

Preferably, the driving apparatus of the wireless data access device may also comprise a clearing module 34 coupled to the processing module 24 and the updating module 32 and configured to acquire the setter identity of the DNS server address in the registry of the terminal before the wireless data access device is disconnected from the terminal in the network, and clear the value of the DNS server address in the registry of the terminal and indicate the updating module to update the setter identity of the DNS server address in a case that the setter identity of the DNS server address is determined as the driving apparatus.

The implementation process of the above embodiments will be described in detail below in conjunction with preferable embodiments and accompanying drawings.

Embodiment One

The embodiment provides a method for configuring IPv4 and IPv6 domain names and a driving apparatus, to ensure that a dynamic host configuration protocol of a terminal is disabled. When a DNS server automatically configured by a driving apparatus and a DNS server set by a user coexist, the DNS server configured by a user is in preference to the DNS server which is automatically configured, so as to ensure the problem of use of the correct DNS server in the terminal.

In an implementation, the method for configuring a DNS server in the embodiment comprises: after the networking is successful, the driving apparatus acquiring a DNS server address from the wireless data access device, and then the driving apparatus acquiring the DNS server address from a registry interface of the terminal and judging whether a user has set the DNS server address in the terminal, if the user has set the DNS server address, the driving apparatus no longer automatically configuring the DNS server address, and if the user has not set the DNS server address, the driving apparatus setting the DNS server address acquired from the wireless data access device in the terminal (the processes for the IPv6 and IPv4 are the same).

The embodiment further provides a driving apparatus, comprising: a networking unit, used to issue a networking command and judge its networking result, to confirm whether the IPv4 or the IPv6 is successfully networked currently; an acquisition unit configured to acquire the DNS server address of the terminal from a registry interface of the terminal; a judgment unit, configured to judge whether a user has set a DNS server address in the registry interface, and if the interface is not empty, judge that the user has set a DNS server address, otherwise, judge that the user has not set the DNS server address; a setting unit, configured to when the DNS server address in the interface is set by a user, identify an identity in the registry, which indicates that the DNS server is set by a user currently, and when the user does not set the DNS server, firstly set the DNS server address automatically, and then identify an identity in the registry, which indicates that the DNS server is set by a driving apparatus currently; and a clearing unit configured to ensure that it is empty at the registry interface or there is a DNS server address set by a user during networking and there can not be a DNS server address which is set the last time (the processes for IPv6 and IPv4 are the same); otherwise, when the networking is successful, the driving apparatus will falsely treat the DNS server address which is set previously by the driving apparatus as being set by the user, resulting in subsequent chaotic setting. For example, when the network is disconnected successfully the last time or when the device is unplugged during networking, the DNS server address should be cleared.

In the embodiment, after the driving apparatus in the terminal receives a networking success message, it is firstly judged whether the IPv4 or the IPv6 is successfully connected currently. If the IPv4 is networked successfully, the driving apparatus acquires an IPv4 IP and a DNS server address from the wireless data access device, and then implements judgment according to the DNS server address acquired from an IPv4 interface in the registry of the terminal. If the DNS server address is empty, it represents that the user has not set the DNS server, and the driving apparatus sets the DNS server address acquired from the wireless data access device in the terminal, and if the DNS server address acquired from the interface is not empty, it represents that the user has set the DNS server and the driving apparatus can no longer set the DNS server address acquired from the wireless data access device in the terminal (the setting process of the IPv6 after the networking is successful is the same as that for the IPv4).

Thus, in the technical solution proposed in the present embodiment, after the wireless data access device is connected successfully, the driving apparatus no longer always sets the DNS server address acquired from the wireless data access device in the terminal, and instead, firstly judges whether the user has set the DNS server address. When the user has set the DNS server address, the driver no longer sets the DNS server address, and if the user has not set the DNS server address, the driver automatically sets the DNS server address. This effectively ensures normal use of IPv4 and IPv6 DNS servers, and the requirements that setting by a user is always in preference to automatic configuration by a driver.

Embodiment Two

Figure 4:
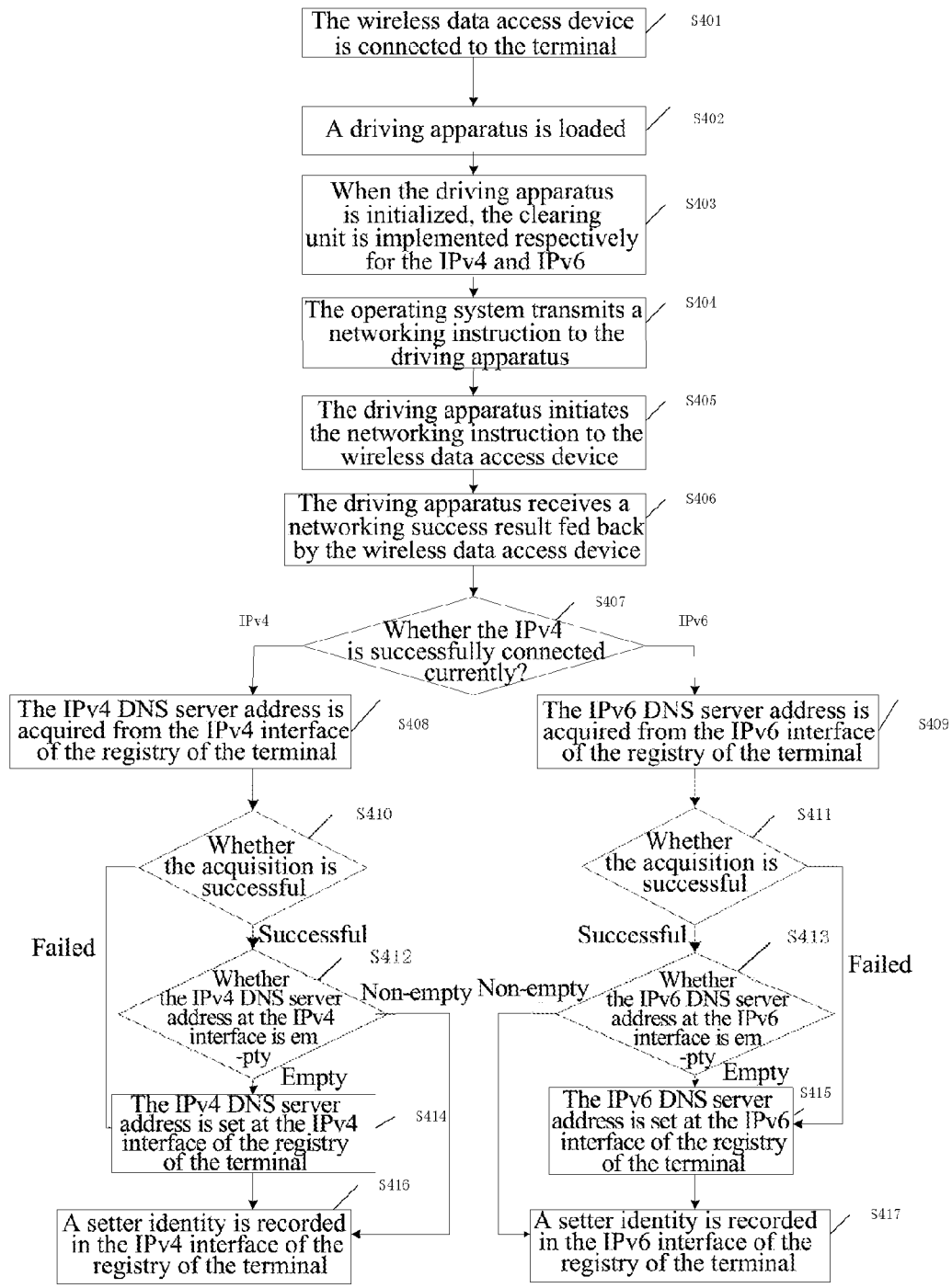
FIG. 4 is a diagram of an implementation flow of a method for configuring a DNS server during networking according to embodiment two of the present invention.

FIG. 4 is a diagram of an implementation flow of a method for configuring a DNS during networking according to embodiment two of the present invention. As shown in FIG. 4, the specific process thereof is as follows.

Figure 6:
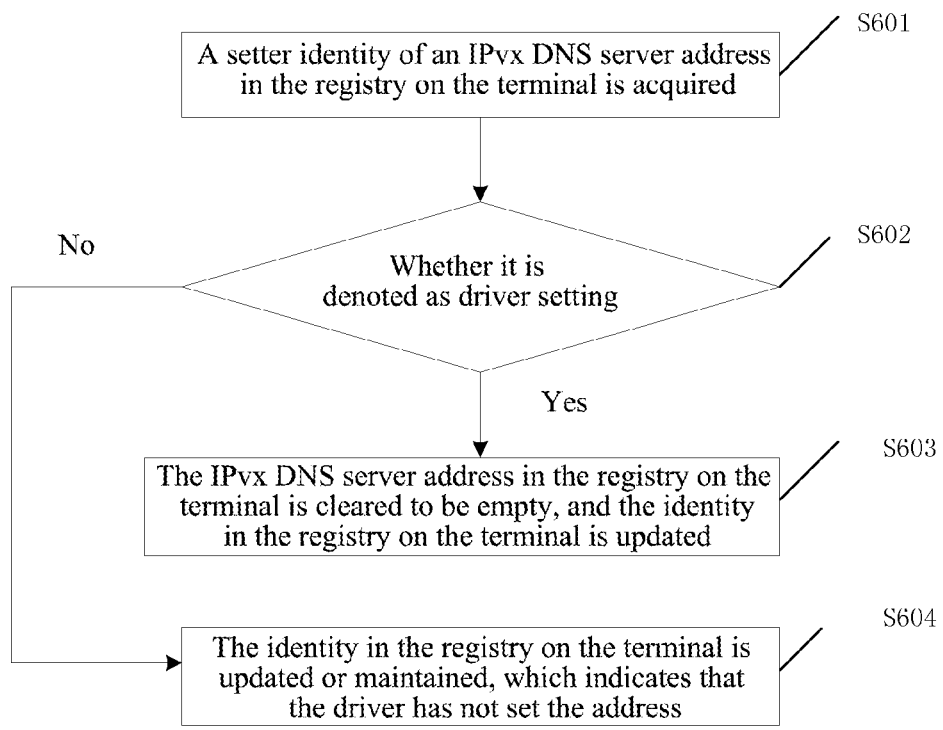
FIG. 6 is a diagram of an implementation flow of a clearing unit in the driving apparatus according to the embodiment three of the present invention.

In step S401, the wireless data access device is connected to the terminal;

in step S402, an operating system in the terminal loads a driving apparatus corresponding to a data port required for accessing transmission with the terminal to a wireless network in the wireless data access device;

in step S403, in the process of initializing the driving apparatus, the clearing unit in the driving apparatus is implemented once respectively for the IPv4 and IPv6 (the process of the clearing unit is as shown in FIG. 6);

in step S404, the operating system transmits a networking instruction to the driving apparatus;

in step S405, the driving apparatus initiates the networking instruction to the wireless data access device;

in step S406, the driving apparatus receives a networking success message fed back by the wireless data access device;

in step S407, the driving apparatus judges whether the IPv4 or the IPv6 is successfully connected currently according to a data format appointed with the wireless data access device; if it is the IPv4, implements operations according to IPv4 related process; and if it is the IPv6, then implements operations according to IPv6 related process;

Wherein, the IPv4 related process is as follows:

in step S408, the driving apparatus acquires the IPv4 DNS server address from the IPv4 interface of the registry of the terminal;

in step S410, the driving apparatus implements judgment according to the acquisition result of S408, and if the acquisition is failed, directly turns to S414, and if the acquisition is successful, continues to implement S412;

in step S412, the driving apparatus judges whether the IPv4 DNS server address at the interface is empty, and if it is not empty, it represents that the user has set the IPv4 DNS server address, and S416 is directly implemented, and if it is empty, S414 continues to be implemented;

in step S414, the driving apparatus sets the IPv4 DNS server address in the interface of the registry;

In step S416, the driving apparatus records an identity of the setter which sets the IPv4 DNS server address in the registry, and if the address is set by a user, the user is recorded, and if the address is set by a driver, the driving apparatus is recorded, and the process ends.

The IPv6 related process is as follows:

in step S409, the driving apparatus acquires the IPv6 DNS server address from the IPv6 interface of the registry of the terminal;

in step S411, the driving apparatus implements judgment according to the acquisition result of S409, and if the acquisition is failed, directly turns to S415, and if the acquisition is successful, continues to implement S413;

in step S413, the driving apparatus judges whether the IPv6 DNS server address at the interface is empty, and if it is not empty, it represents that the user has set the IPv6 DNS server address, and S417 is directly implemented, and if it is empty, S415 continues to be implemented;

in step S415, the driving apparatus sets the IPv6 DNS server address in the interface of the registry;

In step S417, the driving apparatus records an identity of the setter which sets the IPv6 DNS server address in the registry, and if the address is set by a user, the user is recorded, and if the address is set by a driver, the driving apparatus is recorded, and the process ends.

Wherein, the clearing unit in step S403 ensures that the DNS server address at the registry interface in the terminal can at most have a value set manually by a user when the driving apparatus judges whether the DNS server address needs to be set if the networking is successful the next time. The manual setting comprises setting by a user through a network connection, or setting by a user through an application program.

It should be illustrated that the setting of a DNS server address by a user may occurs at any time when the device is initialized or before the device is started to perform networking by a user, but the time can not be foreknown. If the clearing unit of the driving apparatus is invoked before the networking, the DNS server address set by a user may possibly be cleared, and therefore, the driving apparatus needs to invoke the clearing unit in the following two cases: (1) the driving apparatus invokes the clearing unit after the network is successfully disconnected, and the operation ensures that there can be at most a DNS server address set by the user at the registry interface, when the networking is successful the last time, then the network is disconnected after the driving apparatus has set the DNS server address, and then the network is connected again; and (2) the driving apparatus invokes the clearing unit in the process of loading the initialization of the device. Before the process, the driving apparatus has not completed starting of the device, and the user can not set the DNS server address. This operation ensures that there can be at most a DNS server address set by the user at the registry interface, when the networking is successful the last time, the network is not disconnected after the driving apparatus has set the DNS server address, conditions such as a user unplugs a modem, power is off or power is cut abnormally occur, the user plugs the modem and then the network is connected again.

Wherein, the networking instruction initiated by the operating system in step S404 is not limited to IPv4 or IPv6, and may be IPv4 or IPv6 single-stack or IPv4 or IPv6 dual-stack.

Embodiment Three

Figure 5:
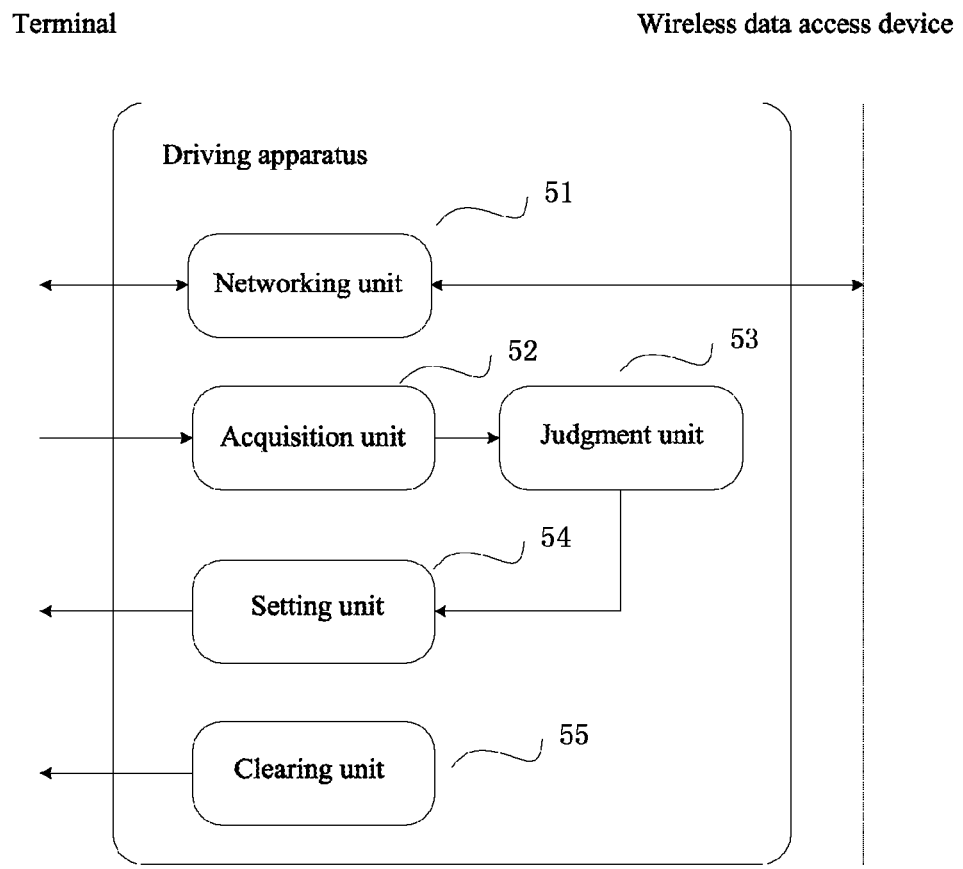
FIG. 5 is a structural diagram of a driving apparatus according to embodiment three of the present invention.

FIG. 5 is a structural diagram of a driving apparatus according to embodiment three of the present invention. As shown in FIG. 5, the driving apparatus comprises a networking unit 51, an acquisition unit 52, a judgment unit 53, a setting unit 54 and a clearing unit 55, wherein:

the networking unit 51 is configured to receive a networking command issued by a operating system, and encapsulate the networking command as IPv4 and IPv6 networking commands identifiable by a wireless data device, and when the wireless data device notifies that the driving apparatus is successfully networked, be responsible for parsing whether the IPv4 or the IPv6 is successfully networked currently;

he acquisition unit 52 is configured to acquire the DNS server address in the IPvx (for example, IPv4 or IPv6) interface in the terminal;

the judgment unit 53 is configured to judge a condition of IPvx DNS server address acquired by the acquisition unit 52;

the setting unit 54 is configured to set the registry according to different judgment results of the judgment unit 53, including setting of a DNS server address in the IPvx interface in the registry and setting an identity indicating whether the DNS server address in the interface has be set by a driver;

the clearing unit 55 is configured to clear the IPvx DNS server address which has been set previously by the driver in cases such as network disconnection etc., and update the setting identity of the DNS server address in the registry.

Preferably, the clearing unit of the driving apparatus in the present embodiment is used in the process of the initialization of driving apparatus is loaded and after the network is disconnected successfully. When the driving apparatus is initialized, the driving apparatus implements the clearing unit once respectively for the IPv4 and IPv6; and after the network is disconnected successfully, the driving apparatus needs to firstly judge whether the network is disconnected successfully for the IPv4 or the IPv6, and if the network is disconnected successfully for the IPv4, the clearing unit is implemented to clear the DNS server address of IPv4 which is set by a driver, and if the network is disconnected successfully for the IPv6, the clearing unit is implemented to clear the DNS server address of IPv6 which is set by the driver.

FIG. 6 is a diagram of an implementation flow of a clearing unit of the driving apparatus according to embodiment three of the present invention. As shown in FIG. 6, the specific process thereof is as follows.

In step S601, a setter identity of an IPvx DNS server address in the registry on the terminal is acquired;

In step S602, it is judged whether the setter identity of the IPvx DNS server address in step S601 is driver setting, and if is not driving setting, the process will end directly and proceed to step S604, and if it is driving setting, S603 will continue to be performed;

in step S603, the IPvx DNS server address in the registry on the terminal is cleared to be empty, and the identity in the registry on the terminal is updated;

in step S604, the identity in the registry on the terminal is updated or maintained, which indicates that the driver has not set the address.

In conclusion, the embodiments of the present invention provide a method for configuring a domain name in an IPv4/IPv6 network and a driving apparatus, in which after the wireless data access device is successfully networked with a terminal, the driving apparatus of the wireless data access device judges whether a user has set a DNS server address in the terminal; and in a case that it is determined that the user has set a DNS server address in the terminal, the driving apparatus does not automatically configure a DNS server address; and in a case that it is determined that the user has not set a DNS server address in the terminal, the driving apparatus sets a DNS server address acquired from the wireless data access device in the terminal. In such way, the problem in related technologies that the terminal cannot be guaranteed to use a DNS server manually configured by a user always in preference to a DNS server automatically configured by a driver is solved, normal use of IPv4 and IPv6 DNS servers is ensured, and the stability and accuracy of a system are improved.

Obviously, those skilled in the art should understand that each module or each step of the aforementioned present document can be implemented with general computing devices, and can be integrated in a single computing device, or distributed onto a network consisting of a plurality of computing devices; alternatively, they can be implemented with program codes executable by the computing devices, and therefore, they can be stored in storage devices to be executed by the computing devices; alternatively, they are respectively made into a plurality of integrated circuit modules; alternatively, it is implemented with making several modules or steps of them into a single integrated circuit module. Thus, the present document is not limited to any specific combinations of hardware and software.

The above description is only the preferred embodiments of the present invention and is not intended to limit the present invention. For those skilled in the art, the present document can have various modifications and variations. And all of these modifications, equivalent replacements or the improvements and so on without departing from the spirit and essence of the present document should be included in the protection scope of the present document.

INDUSTRIAL APPLICABILITY

Compared with the related technologies, with the method and driving apparatus provided by the embodiments of the present invention, the problem in related technologies that the terminal cannot be guaranteed to use a DNS server manually configured by a user always in preference to a DNS server automatically configured by a driver is solved, normal use of IPv4 and IPv6 DNS servers is ensured, and the stability and accuracy of a system are improved.

What is claimed is:

1. A method for configuring a Domain Name System (DNS) server, comprising:
    after a wireless data access device is successfully networked with a terminal, a driving apparatus of the wireless data access device judging whether a user has set a DNS server address in the terminal; and
    if yes, the driving apparatus not automatically configuring a DNS server address; and if the user has not set a DNS server address in the terminal, the driving apparatus setting a DNS server address acquired from the wireless data access device in the terminal;
    wherein the step of the driving apparatus judging whether the user has set a DNS server address in the terminal comprises:
        the driving apparatus acquiring the DNS server address of the terminal from a registry interface of the terminal, and judging whether a value of the DNS server address is empty; and
        if the value if the DNS server address is empty, confirming that the user has not set the DNS server address in the terminal; and if the value of the DNS server address is not empty, confirming that the user has set the DNS server address in the terminal.

2. The method according to claim 1, wherein, the step of the driving apparatus acquiring the DNS server address of the terminal from the registry interface of the terminal comprises:
    the driving apparatus judging whether an IPv4 address or an IPv6 address is successfully connected currently according to information after the networking is successful and a preset data format; and
    if the IPv4 address is successfully connected currently, the driving apparatus acquiring an IPv4 DNS server address of the terminal from an IPv4 interface of the registry of the terminal; and if the IPv6 address is successfully connected currently, the driving apparatus acquiring an IPv6 DNS server address of the terminal from an IPv6 interface of the registry of the terminal.

3. The method according to claim 2, further comprising:
    after setting the DNS server address acquired from the wireless data access device in the terminal, the driving apparatus updating a setter identity of the DNS server address in the registry of the terminal to be the driving apparatus, wherein the setter identity of the DNS server address indicates a setting mode of the DNS server address in the registry interface of the terminal is at least one of: set by the driving apparatus though network connection attributes, set by the user through network connection attributes, and set by the user through an application program.

4. The method according to claim 3, further comprising:
    before the wireless data access device is disconnected from the terminal in the network, the driving apparatus acquiring the setter identity of the DNS server address in the registry of the terminal, and in a case that the setter identity of the DNS server address is determined to be the driving apparatus, clearing the value of the DNS server address in the registry of the terminal, and updating the setter identity of the DNS server address.

5. The method according to claim 1, further comprising:
    after setting the DNS server address acquired from the wireless data access device in the terminal, the driving apparatus updating a setter identity of the DNS server address in the registry of the terminal to be the driving apparatus, wherein, the setter identity of the DNS server address indicates a setting mode of the DNS server address in the registry interface of the terminal is at least one of: set by the driving apparatus though network connection attributes, set by the user through network connection attributes, and set by the user through an application program.

6. The method according to claim 5, further comprising:
    before the wireless data access device is disconnected from the terminal in the network, the driving apparatus acquiring the setter identity of the DNS server address in the registry of the terminal, and in a case that the setter identity of the DNS server address is determined to be the driving apparatus, clearing the value of the DNS server address in the registry of the terminal, and updating the setter identity of the DNS server address.

7. A driving apparatus of a wireless data access device, comprising at least one processor for executing steps in the following modules:
   a judgment module, configured to judge whether a user has set a DNS server address in the terminal after the wireless data access device is successfully networked with a terminal; and
   a processing module, configured to not automatically configure a DNS server address in a case that the judgment module determines that the user has set a DNS server address in the terminal; and set a DNS server address acquired from the wireless data access device in the terminal in a case that the judgment module determines that the user has not set a DNS server address in the terminal;
   wherein the judgment module comprises:
   an acquisition unit, configured to acquire the DNS server address of the terminal from a registry interface of the terminal; and
   a judgment unit, configured to judge whether a value of the DNS server address acquired by the acquisition unit is empty, and when the value of the DNS server address is empty, confirm that the user has not set the DNS server address in the terminal; and when the value of the DNS server address is not empty, confirm that the user has set the DNS server address in the terminal.

8. The driving apparatus according to claim 7, wherein,
   the judgment unit is further configured to judge whether an IPv4 address or an IPv6 address is successfully connected currently according to information after the networking is successful and a preset data format; and
   the acquisition unit is further configured to acquire an IPv4 DNS server address of the terminal from an IPv4 interface of the registry of the terminal in a case that the judgment unit determines that the IPv4 address is successfully connected currently; and acquire an IPv6 DNS server address of the terminal from an IPv6 interface of the registry of the terminal in a case that the judgment unit determines that the IPv6 address is successfully connected currently.

9. The driving apparatus according to claim 8, further comprising:
   an updating module, configured to update a setter identity of the DNS server address in the registry of the terminal to be the driving apparatus after the processing module sets the DNS server address acquired from the wireless data access device in the terminal, wherein the setter identity of the DNS server address indicates a setting mode of the DNS server address in the registry interface of the terminal is at least one of: set by the driving apparatus though network connection attributes, set by the user through network connection attributes, and set by the user through an application program.

10. The driving apparatus according to claim 9, further comprising:
    a clearing module, configured to acquire the setter identity of the DNS server address in the registry of the terminal before the wireless data access device is disconnected from the terminal in the network, and in a case that the setter identity of the DNS server address is determined to be the driving apparatus, clear the value of the DNS server address in the registry of the terminal and indicate the updating module to update the setter identity of the DNS server address.

11. The driving apparatus according to claim 7, further comprising:
    an updating module, configured to update a setter identity of the DNS server address in the registry of the terminal to be the driving apparatus after the processing module sets the DNS server address acquired from the wireless data access device in the terminal, wherein, the setter identity of the DNS server address indicates a setting mode of the DNS server address in the registry interface of the terminal is at least one of: set by the driving apparatus though network connection attributes, set by the user through network connection attributes, and set by the user through an application program.

12. The driving apparatus according to claim 11, further comprising:
    a clearing module, configured to acquire the setter identity of the DNS server address in the registry of the terminal before the wireless data access device is disconnected from the terminal in the network, and in a case that the setter identity of the DNS server address is determined to be the driving apparatus, clear the value of the DNS server address in the registry of the terminal and indicate the updating module to update the setter identity of the DNS server address.

* * * * *